United States Patent
Li et al.

(10) Patent No.: US 12,548,152 B2
(45) Date of Patent: Feb. 10, 2026

(54) INTRACRANIAL ARTERY STENOSIS DETECTION METHOD AND SYSTEM

(71) Applicants: Beijing Tiantan Hospital, Capital Medical University, Beijing (CN); Beihang University, Beijing (CN)

(72) Inventors: Zixiao Li, Beijing (CN); Tao Liu, Beijing (CN); Liyuan Zhang, Beijing (CN); Yongjun Wang, Beijing (CN); Yuehua Pu, Beijing (CN); Jing Jing, Beijing (CN); Jian Cheng, Beijing (CN); Ziyang Liu, Beijing (CN); Zhe Zhang, Beijing (CN); Wanlin Zhu, Beijing (CN)

(73) Assignees: Beijing Tiantan Hospital, Capital Medical University, Beijing (CN); Beihang University, Beijing (CN)

( * ) Notice: Subject to any disclaimer, the term of this patent is extended or adjusted under 35 U.S.C. 154(b) by 426 days.

(21) Appl. No.: 18/127,902

(22) Filed: Mar. 29, 2023

(65) Prior Publication Data
US 2023/0316509 A1 Oct. 5, 2023

(30) Foreign Application Priority Data
Mar. 29, 2022 (CN) .......................... 202210318143.1

(51) Int. Cl.
*G06T 7/00* (2017.01)
*A61B 5/02* (2006.01)
(Continued)

(52) U.S. Cl.
CPC ............. *G06T 7/0012* (2013.01); *G06T 3/40* (2013.01); *G06T 3/60* (2013.01); *G06T 7/11* (2017.01);
(Continued)

(58) Field of Classification Search
CPC G06T 7/0012; G06T 3/40; G06T 3/60; G06T 7/11; G06T 7/136;
(Continued)

(56) References Cited

FOREIGN PATENT DOCUMENTS

| CN | 112508873 A | * | 3/2021 | ............. G06N 3/045 |
|----|-------------|---|--------|-------------------------|
| CN | 113920435 A | * | 1/2022 | ........... G06F 18/214 |
| CN | 113989230 A | * | 1/2022 | ....... G06F 18/23213 |

OTHER PUBLICATIONS

Wang, C., Zhou, Z., & Chen, Z. (2022). An enhanced YOLOV4 model with self-dependent attentive fusion and component randomized mosaic augmentation for metal surface defect detection. IEEE Access, 10, 97758â97766. https://doi.org/10.1109/access.2022.3203198 (Year: 2022).*

(Continued)

*Primary Examiner* — John Villecco
*Assistant Examiner* — Kyla Guan-Ping Tiao Allen
(74) *Attorney, Agent, or Firm* — Hoffmann & Baron, LLP

(57) ABSTRACT

The present disclosure provides an intracranial artery stenosis detection method and system. The present disclosure obtains artery stenosis detection results based on a first maximum intensity projection (MIP) image and a second MIP image obtained by preprocessing a medical image by adopting a detection model based on an adaptive triplet attention module and generates an auxiliary report and visualization results according to target category information in the artery stenosis detection results. Therefore, the problem that existing manual interpretation methods are easily affected by the subjective experience of doctors and are time-consuming and laborious can be solved, thus improving accuracy and efficiency of intracranial artery stenosis detection. Moreover, by inserting the adaptive triplet attention module into a backbone network of YOLOv4, the present disclosure can realize focus on key regions of (Continued)

high-dimensional features, reduce focus on irrelevant features, and provide characterization ability of the detection model.

9 Claims, 3 Drawing Sheets

(51) Int. Cl.
  *A61B 5/055* (2006.01)
  *G06T 3/40* (2006.01)
  *G06T 3/60* (2006.01)
  *G06T 7/11* (2017.01)
  *G06T 7/136* (2017.01)
(52) U.S. Cl.
  CPC .............. *G06T 7/136* (2017.01); *A61B 5/055* (2013.01); *G06T 2207/20081* (2013.01); *G06T 2207/20084* (2013.01); *G06T 2207/20132* (2013.01); *G06T 2207/30016* (2013.01); *G06T 2207/30101* (2013.01)

(58) Field of Classification Search
  CPC . G06T 2207/20081; G06T 2207/20084; G06T 2207/20132; G06T 2207/30016; G06T 2207/30101; A61B 5/055; A61B 5/02007; A61B 5/7267; A61B 5/742; G06V 2201/03; G06V 10/25; G06F 18/214
  See application file for complete search history.

(56) References Cited

OTHER PUBLICATIONS

Long, W., Wang, Y., Hu, L., Zhang, J., Zhang, C., Jiang, L., & Xu, L. (2024). Triple attention mechanism with Yolov5s for fish detection. Fishes, 9(5), 151. https://doi.org/10.3390/fishes9050151 (Year: 2024).*

* cited by examiner

INTRACRANIAL ARTERY STENOSIS DETECTION METHOD AND SYSTEM

CROSS REFERENCE TO RELATED APPLICATION

This patent application claims the benefit and priority of Chinese Patent Application No. 202210318143.1, filed with the China National Intellectual Property Administration on Mar. 29, 2022, the disclosure of which is incorporated by reference herein in its entirety as part of the present application.

TECHNICAL FIELD

The present disclosure relates to the technical field of image processing, and in particular, to an intracranial artery stenosis detection method and system.

BACKGROUND

At present, the software targeted at intracranial arteries on the market mainly includes RapidAI and iCafe. The RapidLVO software developed by RapidAI Corporation is mainly used to identify intracranial artery occlusion, and cannot achieve detection and identification of stenosis. The iCafe software is mainly used to extract features of intracranial arteries, and use the extracted features as biomarkers for subsequent analysis. Therefore, it cannot achieve artery stenosis automatic detection.

At present, the clinical screening and identification of intracranial artery stenosis based on time-of-flight magnetic resonance angiography (TOF-MRA) images are still mainly based on manual interpretation. However, screening for intracranial artery stenosis is a heavy workload, and manual interpretation relies heavily on the subjective judgment and clinical experience of doctors. Based on this, there is an urgent need to provide a detection method or system that can accurately detect artery stenosis in the field.

SUMMARY

An objective of the present disclosure is to provide an intracranial artery stenosis detection method and system, so as to improve the accuracy of artery stenosis detection and fill the gap of the prior art.

To achieve the above objective, the present disclosure provides the following technical solutions:

An intracranial artery stenosis detection method includes:
preprocessing a medical image of intracranial arteries to obtain a first maximum intensity projection (MIP) image and a second MIP image;
inputting the first MIP image and the second MIP image into a detection model to obtain artery stenosis detection results, where the detection model is a trained YOLOvessel model; the YOLOvessel model is a network model obtained by inserting an adaptive triplet attention module after each cross-stage residual module of a backbone network of a YOLOv4 network model; and the artery stenosis detection results include: target category information, target position information, and a confidence score;
generating an auxiliary report according to the target category information based on preset key-value pair information; and
performing visualization processing on the artery stenosis detection results to obtain visualization results.

Preferably, a process of preprocessing a medical image of intracranial arteries to obtain a first MIP image and a second MIP image specifically includes:
performing format conversion on the medical image of the intracranial arteries to obtain a format-converted image;
resampling the format-converted image using a SimpleITK toolkit to obtain a sampled image;
redirecting the sampled image using a dcm2nii toolkit to obtain a left, posterior, superior (LPS) spatial image;
rotating the LPS spatial image at a preset angle to obtain a rotated image;
processing the LPS spatial image by a MIP algorithm to obtain a first initial MIP image;
processing the rotated image by the MIP algorithm to obtain a second initial MIP image;
performing image binarization on the first initial MIP image and the second initial MIP image using an adaptive threshold algorithm to obtain a first binary image and a second binary image;
obtaining coordinates of boundary points of the first binary image and coordinates of boundary points of the second binary image, and determining center point coordinates of the first binary image and center point coordinates of the second binary image;
cropping the first initial MIP image based on the center point coordinates of the first binary image to obtain the first MIP image; and
cropping the second initial MIP image based on the center point coordinates of the second binary image to obtain the second MIP image.

Preferably, the preset angle is 135 degrees.

Preferably, the adaptive triplet attention module includes: a first branch unit, a second branch unit, a third branch unit, and a weighting unit.

An input of the first branch unit, an input of the second branch unit, and an input of the third branch unit are all outputs of the cross-stage residual module. An input of the weighting unit is an output of the first branch unit, an output of the second branch unit, and an output of the third branch unit.

Preferably, a data processing process of the first branch unit is:
performing dimensional permutation on an input feature with a dimension of $C*H*W$ to obtain a feature with a dimension of $H*C*W$;
Z-pooling the feature with the dimension of $H*C*W$ to obtain a feature with a dimension of $2*C*W$;
performing 3*3 dilated convolution and BatchNorm processing on the feature with the dimension of $2*C*W$ to obtain a feature with a dimension of $1*C*W$;
obtaining a first attention weight using a Sigmoid activation function based on the feature with the dimension of $1*C*W$; and
multiplying the first attention weight by the feature with the dimension of $H*C*W$, and performing dimensional permutation to obtain a first output feature, where the first output feature has a dimension of $C*H*W$.

Preferably, a data processing process of the second branch unit is:
performing dimensional permutation on an input feature with a dimension of $C*H*W$ to obtain a feature with a dimension of $W*H*C$;
Z-pooling the feature with the dimension of $W*H*C$ to obtain a feature with a dimension of $2*H*C$;

performing 3*3 dilated convolution and BatchNorm processing on the feature with the dimension of 2*H*C to obtain a feature with a dimension of 1*H*C;

obtaining a second attention weight using a Sigmoid activation function based on the feature with the dimension of 1*H*C; and multiplying the second attention weight by the feature with the dimension of W*H*C, and performing dimensional permutation to obtain a second output feature, where the second output feature has a dimension of C*H*W.

Preferably, a data processing process of the third branch unit is:

Z-pooling an input feature with a dimension of C*H*W to obtain a feature with a dimension of 2*H*W;

performing 3*3 dilated convolution and BatchNorm processing on the feature with the dimension of 2*H*W to obtain a feature with a dimension of 1*H*W;

obtaining a third attention weight using a Sigmoid activation function based on the feature with the dimension of 1*H*W; and multiplying the third attention weight by the input feature with the dimension of C*H*W to obtain a third output feature.

Preferably, an output feature of the weighting unit is T:

$T=⅓*(a_1*T_1+a_2*T_2+a_3*T_3)$, where $a_1$ is a first weight coefficient, $T_1$ is an output feature of the first branch unit, $a_2$ is a second weight coefficient, $T_2$ is an output feature of the second branch unit, $a_3$ is a third weight coefficient, and $T_3$ is an output feature of the third branch unit.

Preferably, a process of performing visualization processing on the artery stenosis detection results to obtain visualization results specifically includes:

drawing a bounding box on the first MIP image and the second MIP image according to the artery stenosis detection results; and labeling a target category name and the confidence score on the bounding box.

According to specific embodiments provided by the present disclosure, the present disclosure discloses the following technical effects:

The intracranial artery stenosis detection method provided by the present disclosure obtains artery stenosis detection results based on a first MIP image and a second MIP image obtained by preprocessing a medical image by adopting a detection model based on an adaptive triplet attention module and generates an auxiliary report and visualization results according to target category information in the artery stenosis detection results. Therefore, the problem that existing manual interpretation methods are easily affected by the subjective experience of doctors and are time-consuming and laborious can be solved, thus improving accuracy and efficiency of intracranial artery stenosis detection. Moreover, by inserting the adaptive triplet attention module into a backbone network of YOLOv4, the present disclosure can realize focus on key regions of high-dimensional features, reduce focus on irrelevant features, and provide characterization ability of the detection model.

Corresponding to the intracranial artery stenosis detection method provided above, the present disclosure further provides an intracranial artery stenosis detection system, including:

a preprocessing subsystem configured to preprocess a medical image of intracranial arteries to obtain a first MIP image and a second MIP image;

an artery stenosis detection subsystem configured to input the first MIP image and the second MIP image into a detection model to obtain artery stenosis detection results, where the detection model is a trained YOLOvessel model; the YOLOvessel model is a network model obtained by inserting an adaptive triplet attention module after each cross-stage residual module of a backbone network of a YOLOv4 network model; and the artery stenosis detection results include: target category information, target position information and a confidence score;

an information analysis subsystem configured to generate an auxiliary report according to the target category information based on preset key-value pair information; and a visualization subsystem configured to perform visualization processing on the artery stenosis detection results to obtain visualization results.

Since the technical effect of the intracranial artery stenosis detection system provided by the present disclosure is the same as that of the intracranial artery stenosis detection method provided above, it will not be repeated here.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an intracranial artery stenosis detection method and system, so as to improve the accuracy of artery stenosis detection and fill the gap of the prior art.

To make the above objectives, features, and advantages of the present disclosure clearer and more comprehensible, the present disclosure will be further described in detail below with reference to the accompanying drawings and the specific embodiments.

Figure 1:
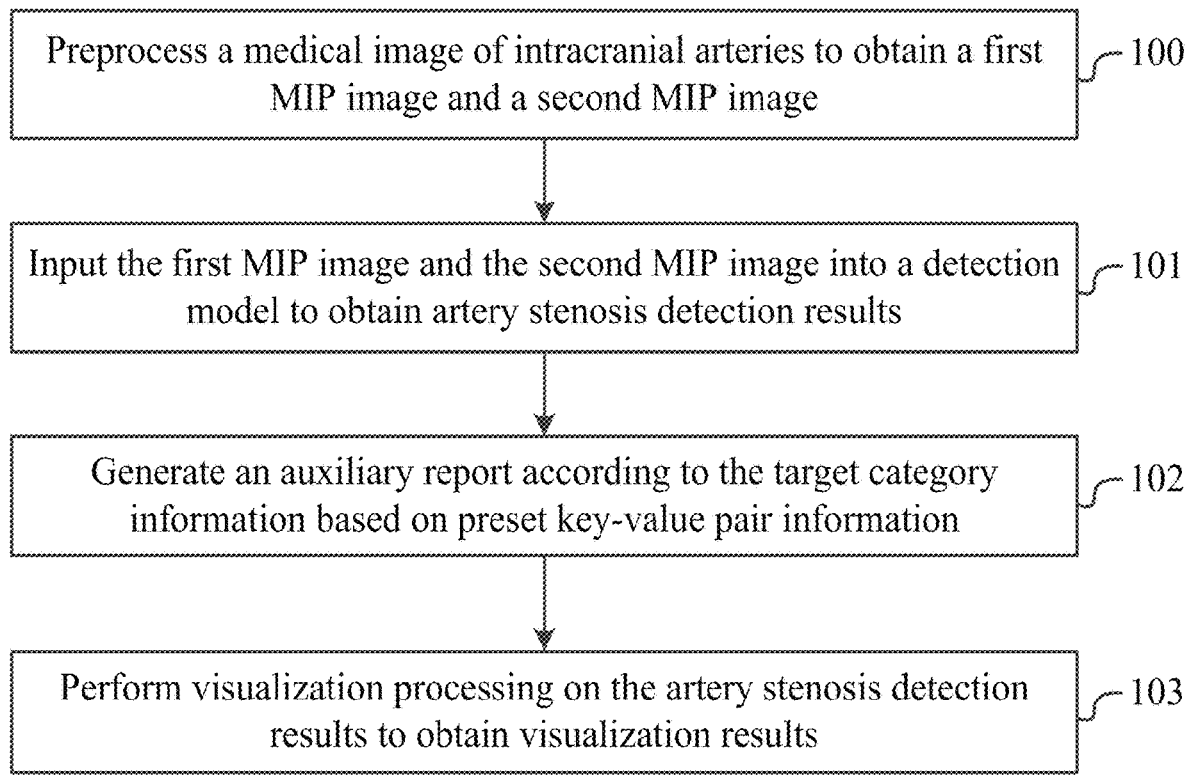
FIG. 1 is a flow chart of an intracranial artery stenosis detection method provided by the present disclosure.

As shown in FIG. 1, an intracranial artery stenosis detection method provided by the present disclosure includes the following steps.

Step 100: A medical image of intracranial arteries is preprocessed to obtain a first MIP image and a second MIP image. The medical image of intracranial arteries can be three-dimensional (30) TOF-MRA image data. In the implementation process, this step can include the following substeps.

Format conversion is performed on the medical image of the intracranial arteries to obtain a format-converted image. After format conversion, the unified output format is NIfTI format, with the file suffix .nii or .nii.gz.

The format-converted image is resampled using a SimpleITK toolkit to obtain a sampled image.

The sampled image is redirected using a dcm2nii toolkit to obtain an LPS spatial image. For example, the spatial resolution of the obtained LPS spatial image can be 0.3 mm*0.3 mm*0.3 mm.

Figure 2:
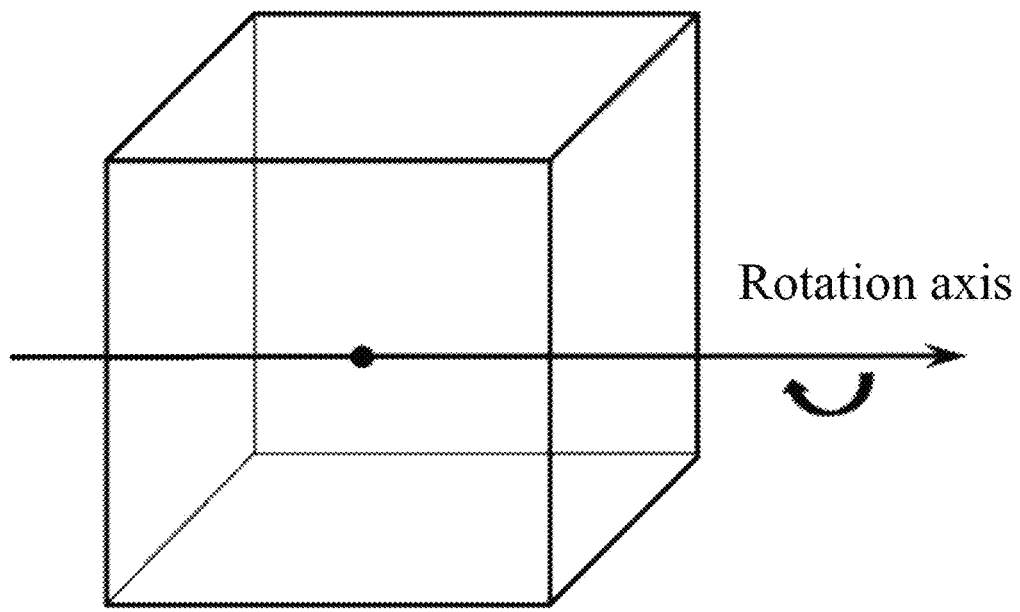
FIG. 2 is a schematic diagram of image rotation provided by an embodiment of the present disclosure.

The LPS spatial image is rotated at a preset angle to obtain a rotated image. For example, when the preset angle is 135 degrees, the rotation process is shown in FIG. 2. The black dot in FIG. 2 is the center point of the 30 space of the data, and the rotation axis is a straight line that passes through the point and is parallel to the upper and lower surfaces.

The LPS spatial image is processed by a MIP algorithm to obtain the first initial MIP image.

The rotated image is processed by the MIP algorithm to obtain a second initial MIP image.

Image binarization is performed on the first initial MIP image and the second initial MIP image using an adaptive threshold algorithm to obtain a first binary image and a second binary image.

Coordinates of boundary points of the first binary image and coordinates of boundary points of the second binary image are obtained, and center point coordinates of the first binary image and center point coordinates of the second binary image are determined. When the coordinates of the boundary points are determined, the coordinates of the top, bottom, left, and right boundary points can be determined only.

The first initial MIP image is cropped based on the center point coordinates of the first binary image to obtain the first MIP image.

The second initial MIP image is cropped based on the center point coordinates of the second binary image to obtain the second MIP image. The size of the first MIP image and the second MIP image obtained by cropping can be 416*416 pixels.

Step 101: The first MIP image and the second MIP image are input into a detection model to obtain artery stenosis detection results. The detection model is a trained YOLOvessel model. The YOLOvessel model is a network model obtained by inserting an adaptive triplet attention module after each cross-stage residual module of a backbone network of a YOLOv4 network model. The artery stenosis detection results include target category information, target position information, and a confidence score.

Step 102: An auxiliary report is generated according to the target category information based on preset key-value pair information. Specifically, two MIP images are input, and prediction is performed through the detection model to obtain the target category information. The results of the target categories from two MIP images are combined and then de-duplicated. Through the preset key-value pair information (number and category name) during manual labeling, the number of the target category information is corresponding to the text version of the auxiliary report information.

Step 103: Visualization processing is performed on the artery stenosis detection results to obtain visualization results. Specifically, a bounding box is drawn on the first MIP image and the second MIP image according to the artery stenosis detection results. The target category names and the confidence scores are labeled on the bounding box.

Figure 3:
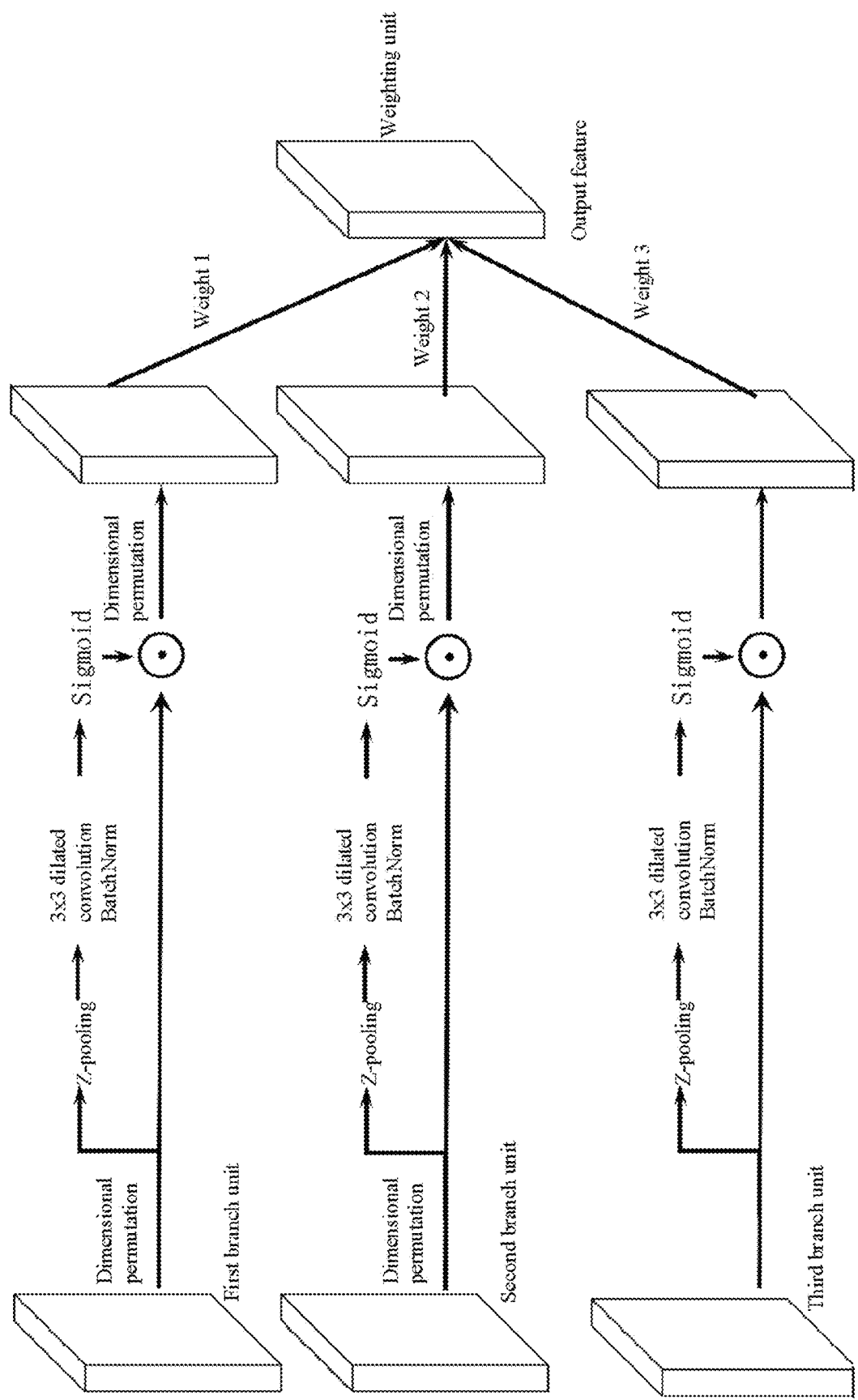
FIG. 3 is a schematic structural diagram of an adaptive triplet attention module provided by the embodiment of the present disclosure.

Further, the traditional triplet attention module uses a convolution kernel with a size of 7*7 in three branches. When the features of three branches are fused, the weights of the channels of the three branches are set as 1:1:1 by default through a simple averaging method, which leads to low accuracy and low data processing efficiency of output results. In order to solve this problem, when constructing the adaptive triplet attention module, the present disclosure introduces three learnable parameter weights, and performs a weighted average calculation on the output features of the three branches, such that the model pays more attention to the more valuable information coding. Specifically, as shown in FIG. 3, the adaptive triplet attention module adopted by the present disclosure includes a first branch unit, a second branch unit, a third branch unit, and a weighting unit.

An input of the first branch unit, an input of the second branch unit, and an input of the third branch unit are all outputs of the cross-stage residual module. An input of the weighting unit is an output of the first branch unit, an output of the second branch unit, and an output of the third branch unit.

A, A data processing process of the first branch unit is as follows.

Dimensional permutation is performed on an input feature with a dimension of C*H*W to obtain a feature with a dimension of H*C*W.

The feature with the dimension of H*C*W is Z-pooled to obtain a feature with a dimension of 2*C*W.

3*3 dilated convolution and BatchNorm processing are performed on the feature with the dimension of 2*C*W to obtain a feature with a dimension of 1*C*W.

A first attention weight is obtained using a Sigmoid activation function based on the feature with the dimension of 1*C*W.

The first attention weight is multiplied by the feature with the dimension of H*C*W, and dimensional permutation is performed to obtain a first output feature. The first output feature has a dimension of C*H*W.

B, A data processing process of the second branch unit is as follows.

Dimensional permutation is performed on an input feature with a dimension of C*H*W to obtain a feature with a dimension of W*H*C.

The feature with the dimension of W*H*C is Z-pooled to obtain a feature with a dimension of 2*H*C.

3*3 dilated convolution and BatchNorm processing are performed on the feature with the dimension of 2*H*C to obtain a feature with a dimension of 1*H*C.

A second attention weight is obtained using a Sigmoid activation function based on the feature with the dimension of 1*H*C.

The second attention weight is multiplied by the feature with the dimension of W*H*C, and dimensional permutation is performed to obtain a second output feature. The second output feature has a dimension of C*H*W.

C, A data processing process of the third branch unit is as follows.

An input feature with a dimension of C*H*W is Z-pooled to obtain a feature with a dimension of 2*H*W.

3*3 dilated convolution and BatchNorm processing are performed on the feature with the dimension of 2*H*W to obtain a feature with a dimension of 1*H*W.

A third attention weight is obtained using a Sigmoid activation function based on the feature with the dimension of 1*H*W.

The third attention weight is multiplied by the input feature with the dimension of C*H*W to obtain a third output feature.

Based on the above processes, an output feature of the weighting unit is T: $T=\frac{1}{3}*(a_1*T_1+a_2*T_2+a_3*T_3)$, where $a_1$ is a first weight coefficient, $T_1$ is an output feature of the first branch unit, $a_2$ is a second weight coefficient, $T_2$ is an output feature of the second branch unit, $a_3$ is a third weight coefficient, and $T_3$ is an output feature of the third branch unit.

By inserting the adaptive triplet attention module into a backbone network of YOLOv4, the present disclosure can realize focus on key regions of high-dimensional features, and reduce focus on irrelevant features, thus improving the characterization ability of the model and the accuracy of intracranial artery stenosis detection.

Further, in order to improve the accuracy of detection, the present disclosure also optimizes the process of training the YOLOvessel model to obtain the detection model, specifically as follows.

S1: The original image data of 3D TOF-MRA is prepared.

S2: MIP sample images are obtained through image preprocessing.

S3: New training samples are generated based on the MIP sample images through the data augmentation method. Data augmentation methods include image rotation and horizontal flipping.

In the process of generating the training sample, the data of the MIP sample image is labeled by the image labeling software Labelling, which is generated in the txt file with the same name as the labeled image file.

Specifically, the labeled target (key-value pair information) on the MIP image includes: 0 (intracranial segment of internal carotid artery, stenosis rate 0-49%), 1 (intracranial segment of internal carotid artery, stenosis rate 50-99%), 2 (intracranial segment of internal carotid artery, stenosis rate 100%), 3 (M1 segment of middle cerebral artery, stenosis rate 0-49%), 4 (M1 segment of middle cerebral artery, stenosis rate 50-99%), 5 (M1 segment of middle cerebral artery, stenosis rate 100%), 6 (M2 segment of middle cerebral artery, stenosis rate 0-49%), 7 (M2 segment of middle cerebral artery, stenosis rate 50-99%), 8 (M2 segment of middle cerebral artery, stenosis rate 100%), 9 (A1 segment of anterior cerebral artery, stenosis rate 0-49%), 10 (A1 segment of anterior cerebral artery, stenosis rate 50-99%), 11 (A1 segment of anterior cerebral artery, stenosis rate 100%), 12 (A2 segment of anterior cerebral artery, stenosis rate 0-49%), 13 (A2 segment of anterior cerebral artery, stenosis rate 50-99%), 14 (A2 segment of anterior cerebral artery, stenosis rate 100%), 15 (P1 segment of posterior cerebral artery, stenosis rate 0-49%), 16 (P1 segment of posterior cerebral artery, stenosis rate 50-99%), 17 (P1 segment of posterior cerebral artery, stenosis rate 100%), 18 (P2 segment of posterior cerebral artery, stenosis rate 0-49%), 19 (P2 segment of posterior cerebral artery, stenosis rate 50-99%), 20 (P2 segment of posterior cerebral artery, stenosis rate 100%), 20 (P2 segment of posterior cerebral artery, stenosis rate 100%), 21 (basilar artery, stenosis rate 0-49%), 22 (basilar artery, stenosis rate 50-99%), 23 (basilar artery, stenosis rate 100%), 24 (V4 segment of vertebral artery, stenosis rate 0-49%), 25 (V4 segment of vertebral artery, stenosis rate 50-99%), and 26 (V4 segment of vertebral artery, stenosis rate 100%), a total of 27 types of stenosis targets. Based on the labeling content, the present disclosure can realize the stenosis detection of 9 segments of intracranial artery (intracranial segment of internal carotid artery, M1 segment of middle cerebral artery, M2 segment of middle cerebral artery, A1 segment of anterior cerebral artery, A2 segment of anterior cerebral artery, P1 segment of posterior cerebral artery, P2 segment of posterior cerebral artery, basilar artery, and V4 segment of vertebral artery). Three grades of different severity are achieved: mild (0-49% stenosis rate), moderate and severe (50-99%), and occlusion (100%).

Through the obtained sample data, the YOLOvessel algorithm is used for training, and the input MIP image is divided into S*S grids through the convolutional neural network (CNN) network of YOLO. S involves three different sizes, and the detection model is generated, which is specified as follows.

S4: The training samples are divided into a training data set and a validation data set by random division in a ratio of 7:3. The training data set is used to train the YOLOvessel model, and the validation data set is used to save the YOLOvessel model with the best performance.

S5: Through modifying the parameters of learning rate and iteration number, model training is performed with the training set, the loss function is used and the backpropagation algorithm is used for continuous optimization. The loss function includes a position loss function, a category loss function, and a confidence loss function. Specifically, the position loss function adopts a complete intersection over union (CIoU) loss function, the category loss function adopts a cross-entropy loss function, and the confidence loss function adopts a cross-entropy loss function.

Based on the detection model obtained above, the drawing process of the bounding box in the above visualization process is as follows.

S1: An image of any size (the first MIP image or the second MIP image) is input, and the aspect ratio of the fixed image is scaled to a fixed size to meet the requirement that the side length is a multiple of 32, to generate a normalized image for input to the network.

S2: The image is divided into S*S grids through the CNN network of YOLO. For the target in which the center point of the bounding box falls within the grid, b bounding boxes are predicted, and each bounding box corresponds to (cn+5) values, where cn represents the number of categories of the detected targets, and the 5 values correspond to an x offset, a y offset, a width scaling factor, a height scaling factor of the bounding box and a confidence score of the detected target respectively.

S3: The predicted b bounding boxes are decoded. The center of the prediction box is obtained by adding the corresponding x offset and y offset to each grid point, and the width and height of the prediction box are calculated by using the anchor box and the width and height scaling factors to determine the position information of the target. The anchor box is obtained by clustering the length and width information of the bounding boxes in the labels of the data set. The target category information is determined by obtaining the index of the maximum value of the category information (including cn values) output by the network.

S4: Bounding boxes whose confidence scores are above the threshold are selected by a preset confidence score threshold, and otherwise discarded.

S5: Through the non-maximum suppression (NMS) algorithm, the bounding box with the highest confidence is selected for multiple bounding boxes of the same target, and the intersection over union (IoU) is calculated based on other results and the bounding box. When the IoU is greater than the preset IoU threshold, the bounding box is deleted, and otherwise retained.

S6: The coordinates of the upper left corner (x1, y1) and the lower right corner (x2, y2) of the bounding box are calculated based on the coordinates of the center point of the target position information and the width and height of the bounding box.

S7: Through the OpenCV toolkit, a rectangular box is drawn at the corresponding position of the image by using the obtained information of the coordinates of the upper left corner and the upper right corner, and the target category information and confidence score are written on the box.

Figure 4:
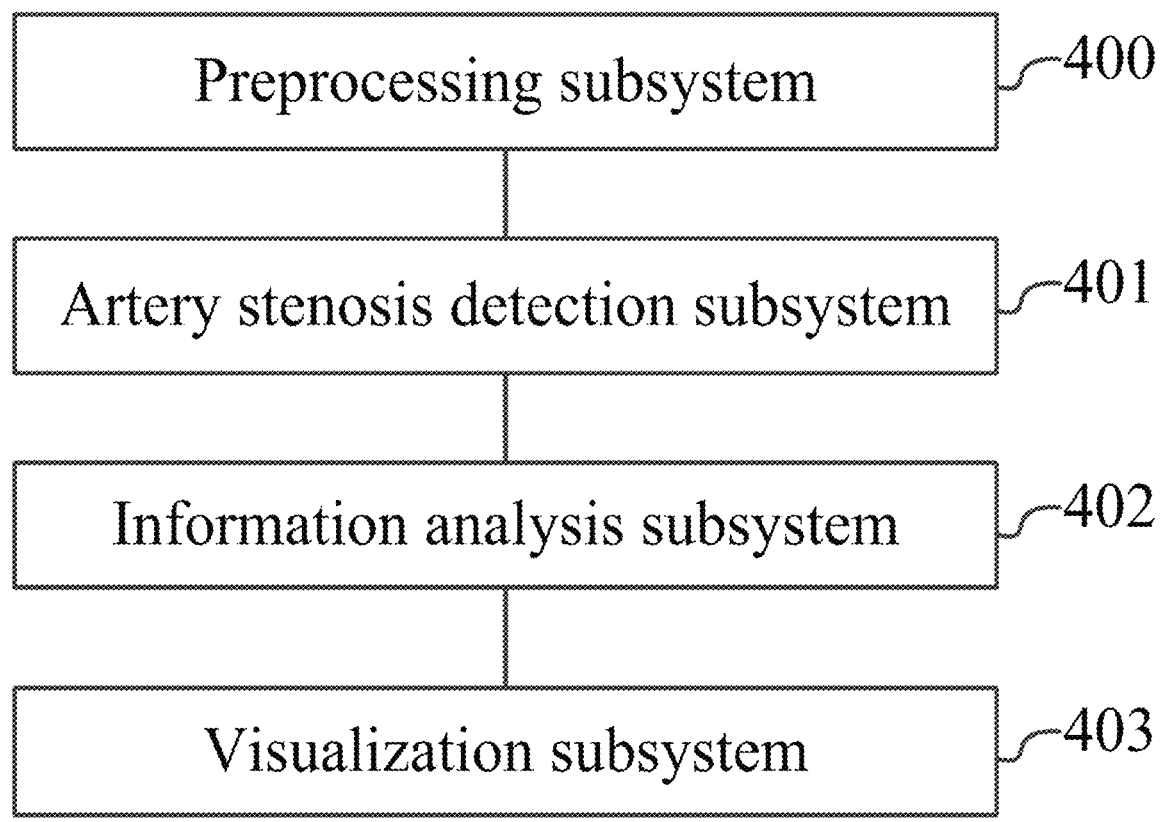
FIG. 4 is a schematic structural diagram of an intracranial artery stenosis detection system provided by the embodiment of the present disclosure.

Moreover, corresponding to the intracranial artery stenosis detection method provided above, the present disclosure further provides an intracranial artery stenosis detection system, as shown in FIG. 4, including a preprocessing subsystem 400, an artery stenosis detection subsystem 401, an information analysis subsystem 402, and a visualization subsystem 403.

The preprocessing subsystem 400 is configured to preprocess a medical image of intracranial arteries to obtain a first MIP image and a second MIP image.

The artery stenosis detection subsystem 401 is configured to input the first MIP image and the second MIP image into a detection model to obtain artery stenosis detection results. The detection model is a trained YOLOvessel model. The YOLOvessel model is a network model obtained by inserting an adaptive triplet attention module after each cross-stage residual module of a backbone network of a YOLOv4 network model. The artery stenosis detection results include target category information, target position information, and a confidence score.

The information analysis subsystem 402 is configured to generate an auxiliary report according to the target category information based on preset key-value pair information.

The visualization subsystem 403 is configured to perform visualization processing on the artery stenosis detection results to obtain visualization results.

The following describes the implementation process of the intracranial artery stenosis detection system provided above by the present disclosure through an embodiment.

S01: Training samples are generated: the prepared MRA data is used as training samples, and each sample generates MIP images from two perspectives through the preprocessing subsystem.

S02: The adaptive triplet attention module is constructed: the features are input into three different branches to model the attention of channel dimension and space dimension. The features of the three branches are aggregated by introducing a learnable parameter to obtain the adaptive triplet attention module.

S03: Based on the YOLOv4 algorithm, adaptive triplet attention is inserted after each cross-stage residual module of the backbone network CSP0arknet53 to obtain the YOLOvessel network.

S04: The detection model is generated: through the training samples obtained in step S01, the YOLOvessel algorithm is used for training, and the input MIP image is divided into S*S grids through the CNN network of YOLO. S involves three different sizes, and the detection model is generated.

S05: The 3D TOF-MRA image data acquired clinically are used to generate MIP images M1 and M2 through the preprocessing subsystem of step S01.

S06: The artery stenosis detection subsystem calls the detection model file generated in step S04 to detect the image M1 in step S05 and obtain the target category information, target position information and confidence score in the image M1. Then, the artery stenosis detection subsystem calls the detection model generated in step S04 to detect M2 in step S05 and obtain the target category information, target position information and confidence score in the image M2.

S07: Through the information analysis subsystem, the target category information in step S06 is input and auxiliary report information is obtained according to the preset key-value pair information.

S08: Through the visualization subsystem, the target category information, target position information and confidence information in step S06 are input, the bounding boxes are drawn on the image M1 and image M2 in step S05, and the target category name and confidence score are written to obtain the visualization results.

Each embodiment of this specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and implementations of the present disclosure. The foregoing description of the embodiments is merely intended to help understand the method of the present disclosure and its core ideas; besides, various modifications may be made by those of ordinary skill in the art to specific implementations and the scope of application in accordance with the ideas of the present disclosure. In conclusion, the content of this specification shall not be construed as limitations to the present disclosure.

What is claimed is:

1. An intracranial artery stenosis detection method, comprising:
    preprocessing a medical image of intracranial arteries to obtain a first maximum intensity projection (MIP) image and a second MIP image;
    inputting the first MIP image and the second MIP image into a detection model to obtain artery stenosis detection results, wherein the detection model is a trained YOLOvessel model; the YOLOvessel model is a network model obtained by inserting an adaptive triplet attention module after each cross-stage residual module of a backbone network of a YOLOv4 network model; and the artery stenosis detection results comprise target category information, target position information, and a confidence score;
    generating an auxiliary report according to the target category information based on preset key-value pair information; and
    performing visualization processing on the artery stenosis detection results to obtain visualization results.

2. The intracranial artery stenosis detection method according to claim 1, wherein the process of preprocessing a medical image of intracranial arteries to obtain the first MIP image and the second MIP image specifically comprises:

performing format conversion on the medical image of the intracranial arteries to obtain a format-converted image;

resampling the format-converted image to obtain a sampled image;

redirecting the sampled image to obtain a left, posterior, superior (LPS) spatial image;

rotating the LPS spatial image at a preset angle to obtain a rotated image;

processing the LPS spatial image by a MIP algorithm to obtain a first initial MIP image;

processing the rotated image by the MIP algorithm to obtain a second initial MIP image;

performing image binarization on the first initial MIP image and the second initial MIP image using an adaptive threshold algorithm to obtain a first binary image and a second binary image;

obtaining coordinates of boundary points of the first binary image and coordinates of boundary points of the second binary image, and determining center point coordinates of the first binary image and center point coordinates of the second binary image;

cropping the first initial MIP image based on the center point coordinates of the first binary image to obtain the first MIP image; and cropping the second initial MIP image based on the center point coordinates of the second binary image to obtain the second MIP image.

3. The intracranial artery stenosis detection method according to claim 2, wherein the preset angle is 135 degrees.

4. The intracranial artery stenosis detection method according to claim 1, wherein the adaptive triplet attention module comprises: a first branch unit, a second branch unit, a third branch unit, and a weighting unit; and an input of the first branch unit, an input of the second branch unit, and an input of the third branch unit are all outputs of the cross-stage residual module; and an input of the weighting unit is an output of the first branch unit, an output of the second branch unit, and an output of the third branch unit.

5. The intracranial artery stenosis detection method according to claim 4, wherein a data processing process of the first branch unit is:

performing dimensional permutation on the input of the first branch unit with a dimension of C*H*W to obtain a feature with a dimension of H*C*W;

Z-pooling the feature with the dimension of H*C*W to obtain a feature with a dimension of 2*C*W;

performing 3*3 dilated convolution and Batch Normalization processing on the feature with the dimension of 2*C*W to obtain a feature with a dimension of 1*C*W;

obtaining a first attention weight using a Sigmoid activation function based on the feature with the dimension of 1*C*W; and multiplying the first attention weight by the feature with the dimension of H*C*W, and performing dimensional permutation to obtain the output of the first branch unit, wherein the output of the first branch unit has a dimension of C*H*W.

6. The intracranial artery stenosis detection method according to claim 4, wherein a data processing process of the second branch unit is:

performing dimensional permutation on the input of the second branch unit with a dimension of C*H*W to obtain a feature with a dimension of W*H*C;

Z-pooling the feature with the dimension of W*H*C to obtain a feature with a dimension of 2*H*C;

performing 3*3 dilated convolution and Batch Normalization processing on the feature with the dimension of 2*H*C to obtain a feature with a dimension of 1*H*C;

obtaining a second attention weight using a Sigmoid activation function based on the feature with the dimension of 1*H*C; and multiplying the second attention weight by the feature with the dimension of W*H*C, and performing dimensional permutation to obtain the output of the second branch unit, wherein the output of the second branch unit has a dimension of C*H*W.

7. The intracranial artery stenosis detection method according to claim 4, wherein a data processing process of the third branch unit is:

Z-pooling the input of the third branch unit with a dimension of C*H*W to obtain a feature with a dimension of 2*H*W;

performing 3*3 dilated convolution and Batch Normalization processing on the feature with the dimension of 2*H*W to obtain a feature with a dimension of 1*H*W;

obtaining a third attention weight using a Sigmoid activation function based on the feature with the dimension of 1*H*W; and multiplying the third attention weight by the input of the third branch unit with the dimension of C*H*W to obtain the output of the third branch unit.

8. The intracranial artery stenosis detection method according to claim 4, wherein an output of the weighting unit is T: T=⅓*(a1*T1+a2*T2+a3*T3), wherein $a_1$ is a first weight coefficient, Ti is the output of the first branch unit, $a_2$ is a second weight coefficient, $T_2$ is the output of the second branch unit, a3 is a third weight coefficient, and $T_3$ is the output of the third branch unit.

9. The intracranial artery stenosis detection method according to claim 1, wherein the process of performing visualization processing on the artery stenosis detection results to obtain visualization results specifically comprises:

drawing a bounding box on the first MIP image and the second MIP image according to the artery stenosis detection results; and labeling a target category name and the confidence score on the bounding box.

* * * * *